G. MACHLET, Jr.
APPARATUS FOR PRODUCING PERFORATED MUSIC RECORD SHEETS.
APPLICATION FILED OCT. 10, 1903.
942,398.
Patented Dec. 7, 1909.
6 SHEETS—SHEET 1.
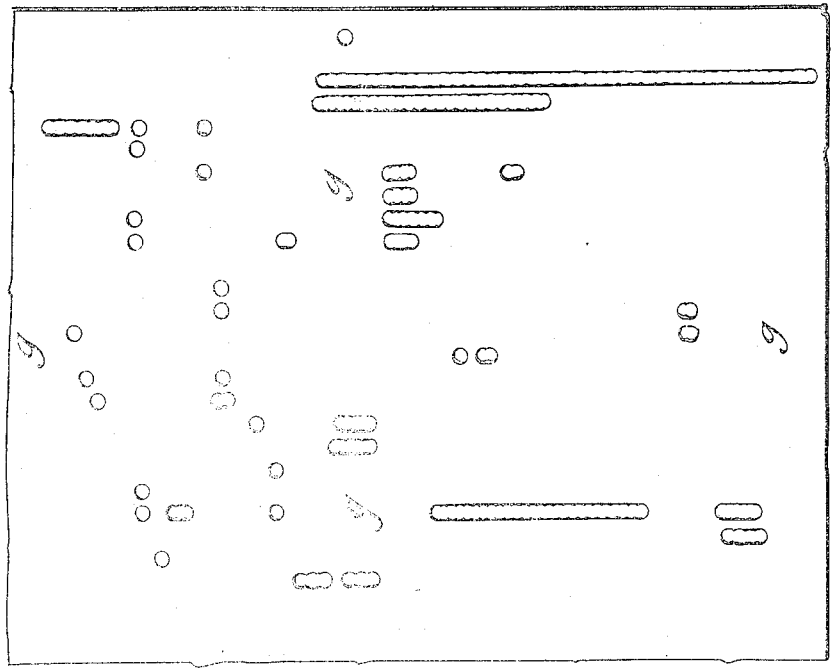
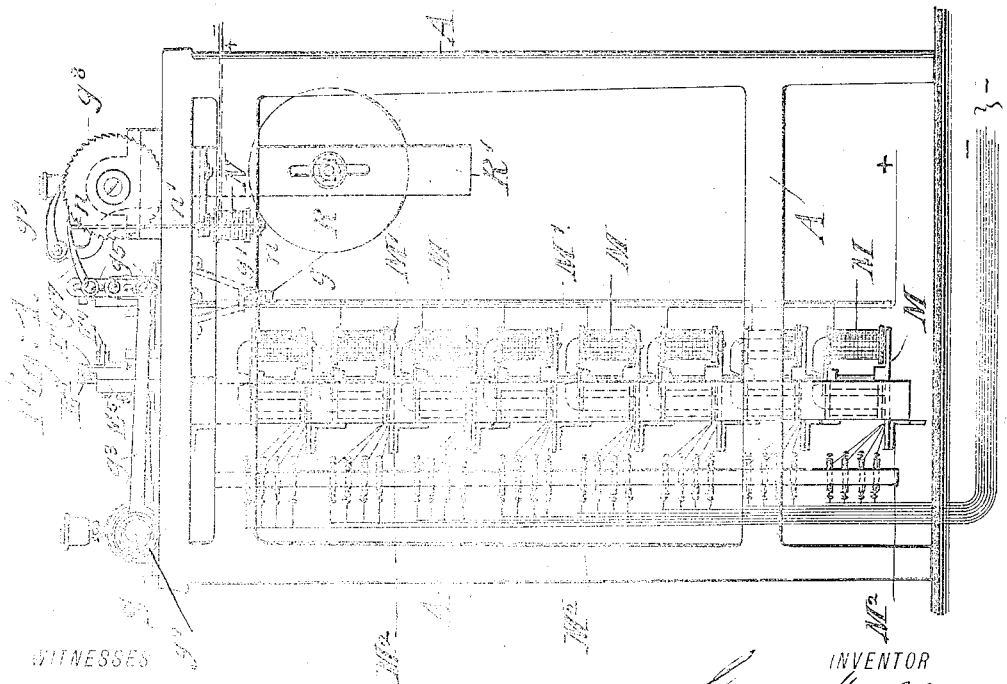
WITNESSES
INVENTOR
George Machlet jr.
BY
Goepel & Niles
ATTORNEYS

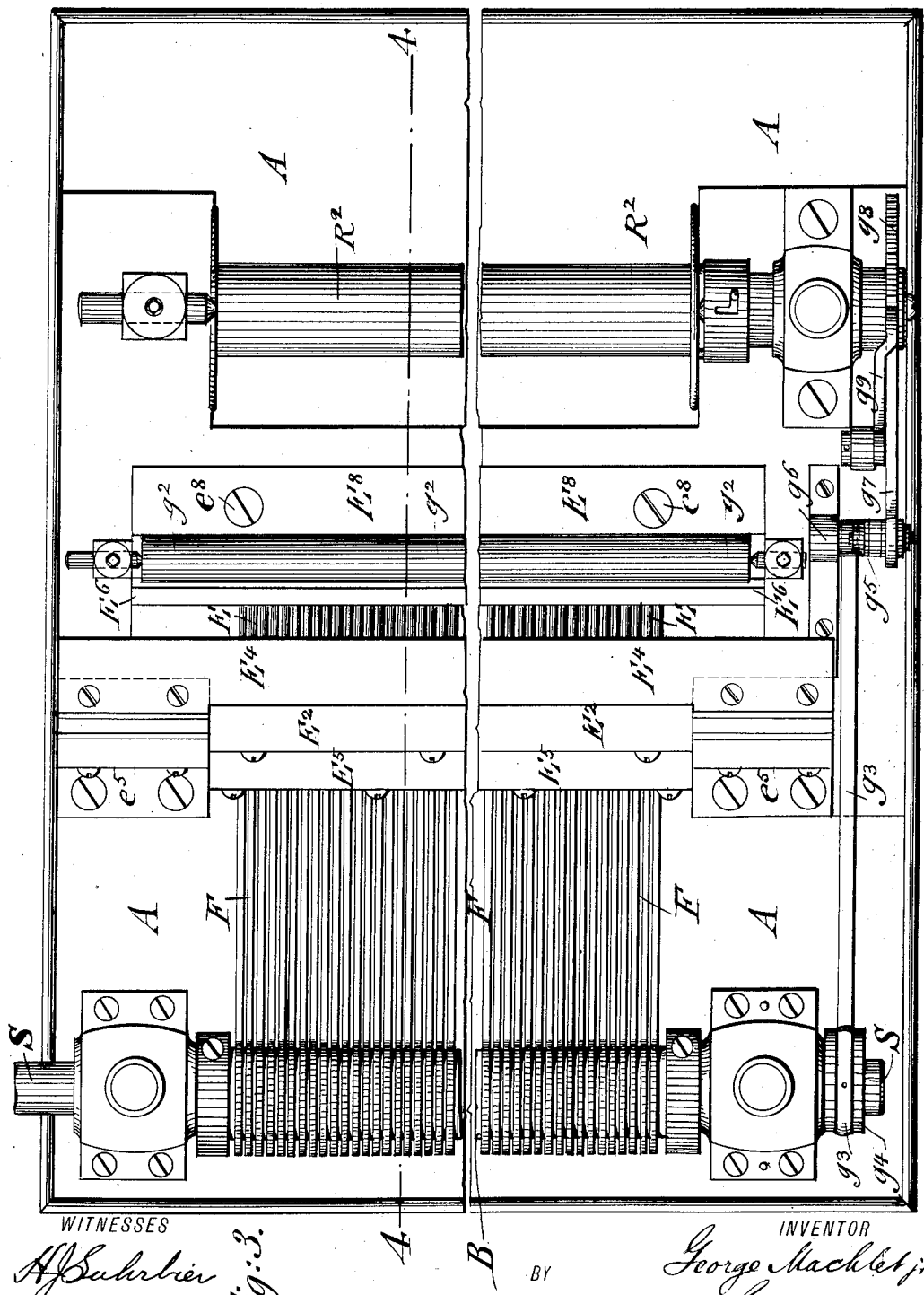

G. MACHLET, Jr.
APPARATUS FOR PRODUCING PERFORATED MUSIC RECORD SHEETS.
APPLICATION FILED OCT. 10, 1903.
942,398.
Patented Dec. 7, 1909.
6 SHEETS—SHEET 3.
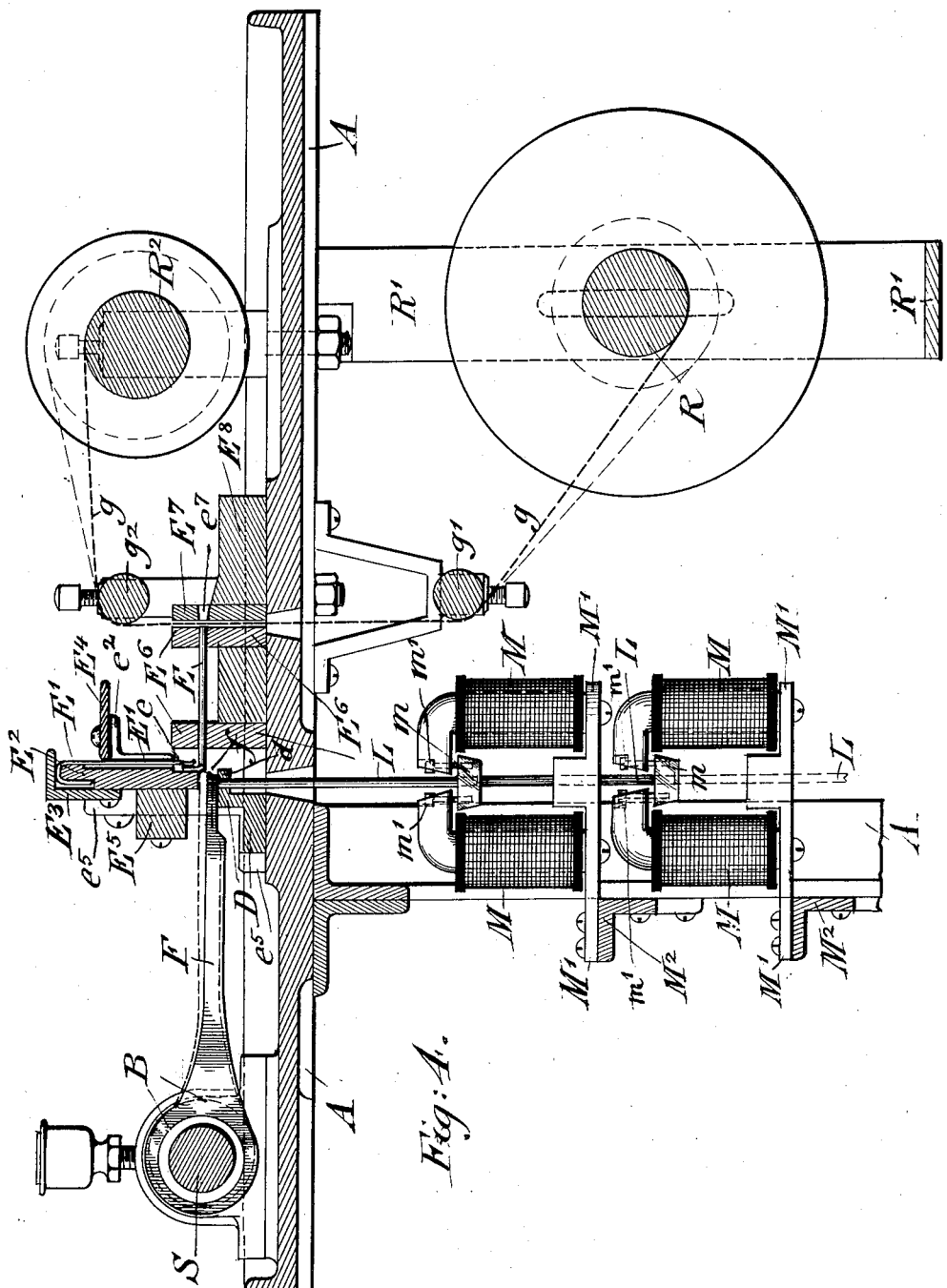
WITNESSES
INVENTOR
BY
ATTORNEYS

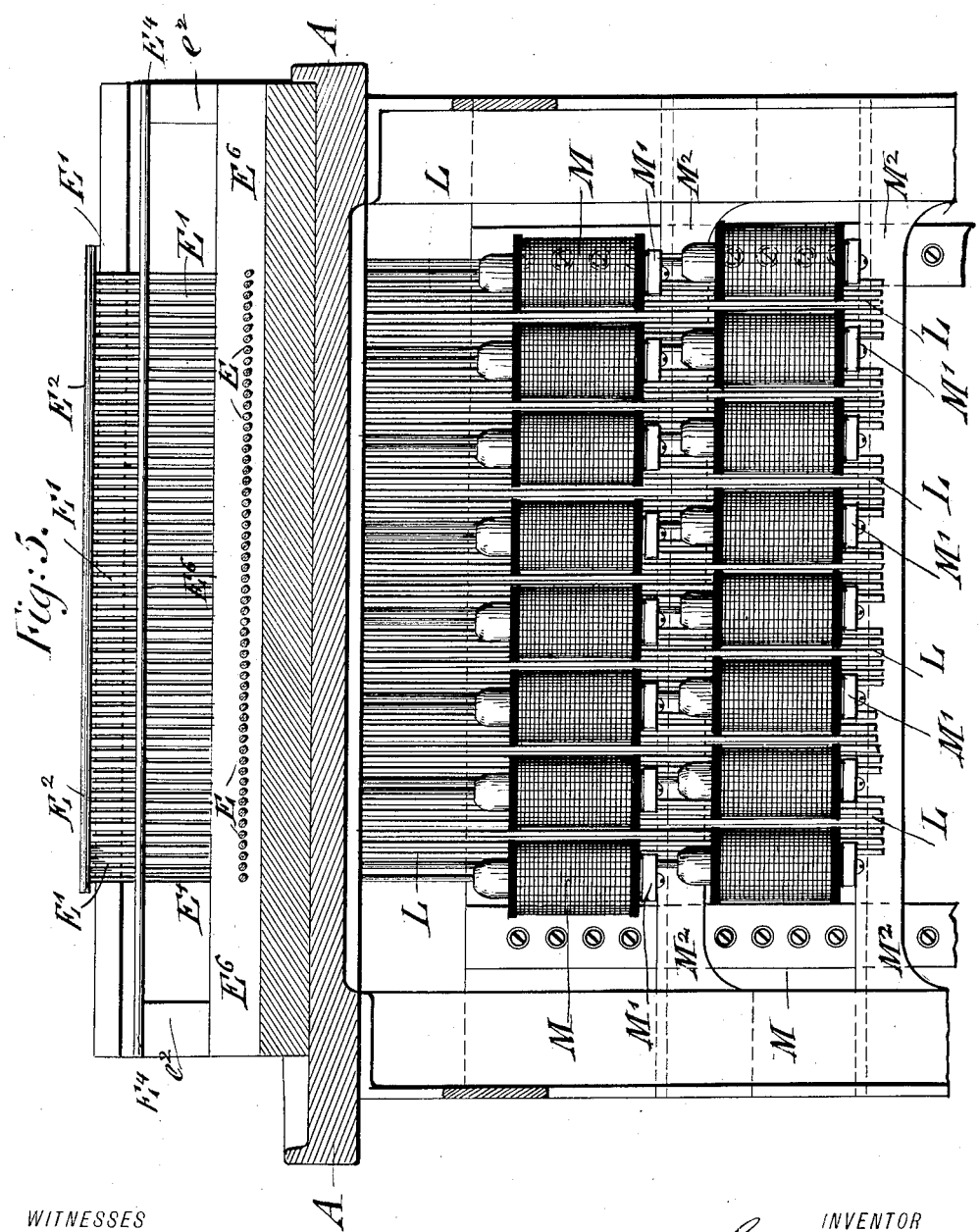

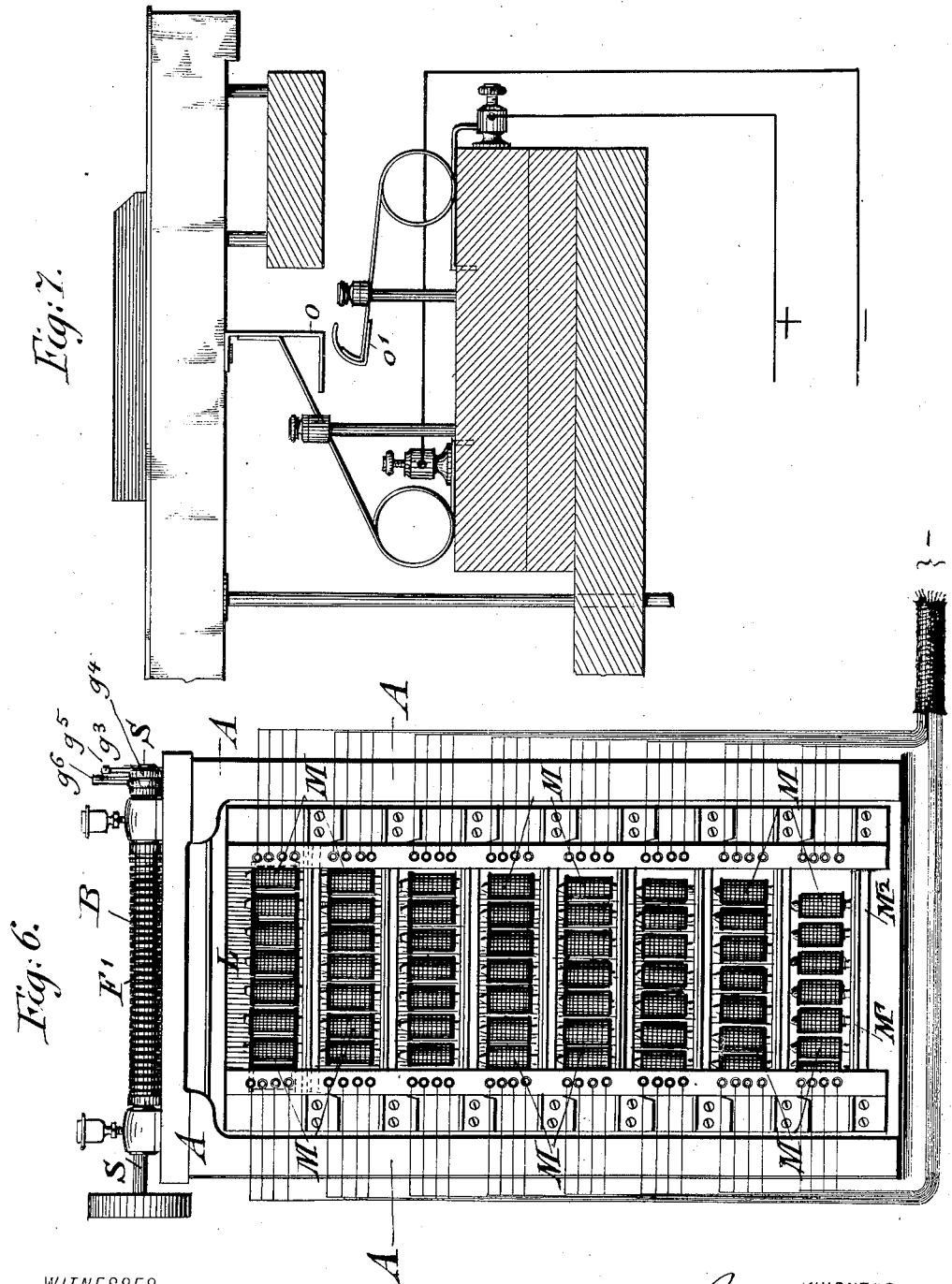

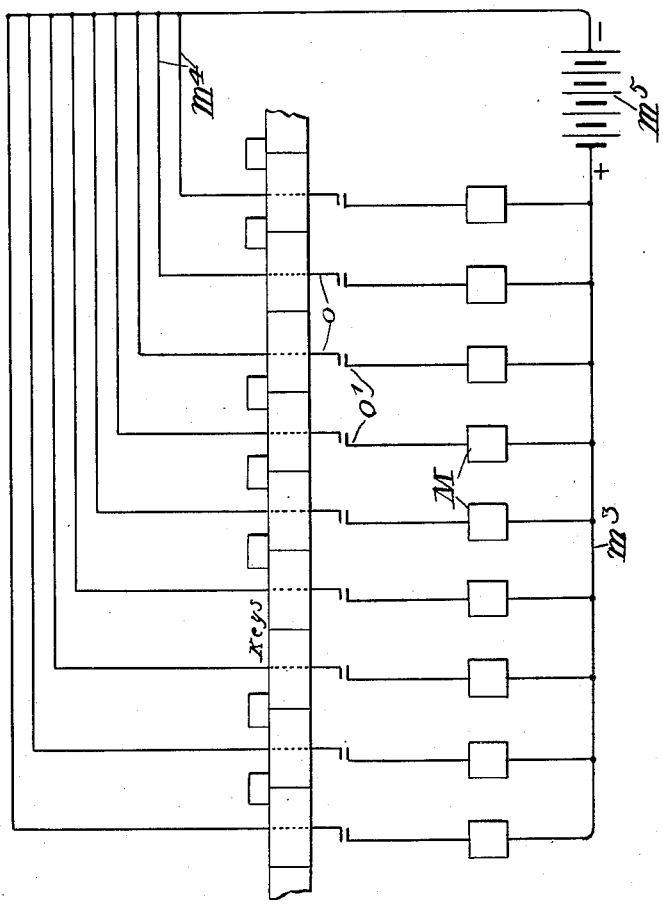

UNITED STATES PATENT OFFICE.

GEORGE MACHLET, JR., OF ELIZABETH, NEW JERSEY.

APPARATUS FOR PRODUCING PERFORATED MUSIC-RECORD SHEETS.

942,398.

Specification of Letters Patent. Patented Dec. 7, 1909.

Application filed October 10, 1903. Serial No. 176,506.

*To all whom it may concern:*

Be it known that I, GEORGE MACHLET, Jr., a citizen of the United States, residing in Elizabeth, in the county of Union and State of New Jersey, have invented certain new and useful Improvements in Apparatus for Producing Perforated Music-Record Sheets, of which the following is a specification.

This invention relates to means for producing original music-record sheets of the sort commonly used in self-playing pianos, etc., and commonly consisting of a sheet or roll of paper provided with perforations suitable for controlling the note-producing devices in such instruments.

Music-record sheets suitable for use upon self-playing instruments, are commonly perforated in such a manner as to take up the least practicable space both widthwise and lengthwise of the sheet, in order to avoid the bulkiness, weight and cost of the paper, and also to avoid the necessity of running the sheets through the self-playing instrument at undue speed, and as well to avoid waste of the pneumatic power by which the noteplaying devices are commonly operated. Slots and holes are cut in the sheets, the slots being of various lengths for producing notes of corresponding duration, and the holes being adapted to produce the short notes. Owing to the limitations mentioned of the dimensions of the sheet, the holes are not only made of small proportions, but are of about equal width and length, so as to permit the admission into the instrument of sufficient compressed air to operate the desired note, but without prolonging the same. Moreover, owing to said limitations, the slots and holes are formed close together sidewise, to avoid undue width of the sheet; and commonly the space separating the holes or slots widthwise of the sheet is considerably narrower than the width of a hole or slot. It also happens in many instances, as for instance when it is desired to effect rapid repetition of a single note on a piano, that it is necessary to produce upon the record sheet a succession of the shortest holes, separated by very slight intervals, so as to admit and cut off in rapid alternation the compressed air at that point in the self-playing instrument where that particular note is operated.

Heretofore sheets possessing the common characteristics described have been produced by manual processes, which were very tedious and laborious; and from master-sheets so produced, duplicates have been secured. Owing mainly to the great cost of producing the original or master-sheets, the prices at which duplicates have commonly been sold to the public have been so high as to be almost prohibitive, in many cases several dollars being charged for a single record. Another objection exists to master-sheets so produced, in that they are quite frequently imperfect; these imperfections being largely due to the fact that the operative who cuts the master sheet must proceed mechanically, and can receive no aid from the sound of the music as he proceeds with the work. Again, a purchaser is compelled to take the record sheet as it has been made by the manufacturer, and cannot obtain a sheet that will produce the music in accordance with the purchaser's individual taste. The record may contain variations that he does not want; or it may lack variations that he does want. Moreover, it is wholly out of the question for the individuality of any musician to find expression through the music record, since it has not been possible for the musician, by playing in his usual manner upon a set of music keys, to produce a record-sheet of the common character above described, and usable in automatic instruments of common type and construction; nor has it been possible to produce such a record sheet while improvising music.

My invention enables a record-sheet of the usual sort above described, to be made by simply playing a piano, organ, or a set of music keys separated from the remaining portions of a musical instrument; and the player or composer may proceed in his usual manner, playing in his usual time. The sheet, by means of my invention, is not only perforated automatically, but with such nicety and perfection that there is obtained thereon an exact reproduction of the composition, whether set music or improvisation, precisely as executed by the player, and hence embodying his individuality of expression. At the same time the cost of making an original or master record-sheet is so far reduced that it becomes almost negligible; and from master sheets so obtained, duplicates may, if desired, be made in the usual way, and may be furnished to the public at nominal prices. Moreover, any desired record may be produced at a moment's notice, which is a great advantage, as it enables a music dealer to furnish promptly any record that may be called for, whereas heretofore only such records could be furnished as had been selected by the manufacturers of master sheets and kept in stock by the dealer. Again, an improviser may, by manipulating a set of music keys unattached to a musical instrument, produce a record sheet, and may immediately, by passing the same through a self-playing instrument, be able to listen to his improvisation.

The invention is applicable to pianos, organs, and other musical instruments, and it will be seen that a record produced by playing upon an organ may be used in a self-playing piano, and vice-versa. It is also noted that by applying my invention to a piano or organ, and then operating the latter by means of a self-playing attachment, a new record my be produced similar to the master-sheet used in the self-playing attachment, so that records may be reproduced in a simple and inexpensive manner to any desired extent.

In carrying out my invention in one form, I employ a series of parallel pushers, a rotary eccentric cam-cylinder for reciprocating said pushers, a corresponding series of horizontally-guided and spring-actuated punches normally located above the plane of said pushers, a series of reciprocating lifters corresponding to the number of pushers, one for each pusher, means for guiding said lifters, motor-devices for actuating the same in connection with the keys of a piano or other instrument, and a continuously-moving music-sheet traversing close to the ends of the punches and being subjected to the punching action of the same under the influence of the reciprocating pushers and lifters. There may also be employed, in connection with the punchers or punches, a system of dies, and means for feeding the music-record sheet intermittently past the system of punches in a direction transverse thereto; and means may also be provided whereby the player may interrupt the feeding movement of the sheet at will. The invention also comprises, in its present form, certain details of construction and combinations of parts, which will be hereinafter described and pointed out in the concluding claims.

In the accompanying drawings, Figure 1 represents a side-elevation of my improved machine for producing perforated music-record sheets, Fig. 2 is a top-view of a portion of a music-record sheet of common type and usable in self-playing instruments of ordinary type, that may be produced by means of my invention, by simply playing upon a set or system of music keys. Fig. 3 is a plan-view of the machine, drawn on a larger scale, a portion of the machine being broken away, Fig. 4 is a vertical longitudinal section, also drawn on a larger scale, on line 4—4, Fig. 3, Fig. 5 is a front-elevation of the upper portion of the machine, partly in section, showing the staggered arrangement of the electromagnets of the motor-devices and the lifters operated thereby, Fig. 6 is a rear-elevation of the machine, showing the arrangement of the lifter-actuating electromagnets and their connection with the piano or other keyed instrument, and Fig. 7 is a detail section, drawn on a larger scale, of one of the keys of the piano or other instrument and its electric connection with one of the electromagnets of the machine. Fig. 8 is a diagram to illustrate the wiring between the music keys and the system of punch-controlling magnets.

Similar letters of reference indicate corresponding parts.

Referring to the drawings A represents the supporting frame of my improved machine for producing music-record sheets. On the top-part of the frame is supported in suitable bearings a shaft S, to which continuous rotary motion is imparted by a suitable belt and pulley-transmission. Between its bearings, the shaft is made in the form of an eccentric cam-cylinder B, so as to impart at each rotation of the shaft a horizontally-reciprocating motion to a series of horizontal parallel fingers or pushers F, which are strapped at their rear-ends to the cam-cylinder and separated by ring-shaped washers from each other. By the continuous rotary motion of the shaft and cam-cylinder, a continuous reciprocating motion is imparted to the entire series of parallel pushers F. The number of pushers F corresponds to the number of keys of a piano or other keyed instrument from which the pieces of music that are played thereon are to be automatically reproduced in the form of permanent perforated music-record sheets. The tapered front-ends of the pushers F are supported on a transverse angular guide-rail D, which is attached at its ends to the frame A. The pushers F are provided at their front-ends with forwardly-extending and rounded off points, which engage the correspondingly recessed rear-ends of horizontally-guided punches E, which are made of round steel-rods and provided at their recessed rear-ends with upwardly-extending heels $e$ that are engaged by as many springs $E^1$ as there are punches, so as to return each punch, after a forward motion has been imparted to the same by its pusher, into its normal position with its heel abutting against a transverse bridge $E^2$. The bridge $E^2$ is supported on the frame A vertically above the ends of the pushers and punches, as shown clearly in Fig. 4. The return-springs $E^1$ of the punches E are suspended by their upper hook-shaped ends from the upper recessed and rounded off end of the bridge $E^2$ and retained by an angle-iron $E^3$ in position on the same. A flat bar $E^4$ is supported at both ends on brackets $e^2$ attached to the ends of the bridge $E^2$ and serves to retain the shanks of the springs so that the latter are returned into their normal position and act in a reliable manner on the upwardly-projecting heels of the punches as soon as the latter are released from their pushers F.

The bridge $E^2$ is attached to a transverse rail $E^5$, which is supported at both ends by angular brackets $e^5$, attached to the frame A, as shown clearly in Figs. 1 and 4. The punches E are guided in their reciprocating motion by two transverse rails $E^6$ which are supported at their ends on the frame A, and provided with as many perforations as there are punches. The punches E are guided by the rails $E^2$ in a horizontal plane, slightly above the pointed front-ends of their pushers. Each pusher F is located in the same vertical plane as its corresponding punch. The rail $E^6$ adjacent to the heels of the punches E is at a sufficient distance from the heels, so as to permit the free reciprocating motion of the punches under the action of their pushers and return-springs, while the second guide-rail $E^6$ is arranged at such a distance from the first rail that the ends of the punches are located when in their normal position of rest in the vertical plane of the outer face of the second guide-rail $E^6$, as shown clearly in Fig. 4. Adjacent to the outer face of the second rail $E^6$ is arranged a steel die-plate $E^7$, which is provided in line with the punches with as many outwardly-tapering perforations $e^7$ as there are punches, the inner ends of the perforations corresponding with the size of the ends of the punches, so that the ends of the punches are accurately guided in the adjacent ends of the perforations $e^7$ when actuated by the reciprocating pushers F. The die-plate $E^7$ is supported on the top of the frame A by a transverse rail $E^8$, and attached thereto by fastening screws $e^8$, as shown in Fig. 3. The distance between the outer face of the second guide-rail $E^6$ and the perforated die-plate $E^7$ is such that a sheet of paper $g$ of the thickness such as is usually employed for the perforated music-sheets can be freely moved in the space between the guide-rail and dieplate. On the other hand the space within which the pushers and punches are arranged corresponds in width to the width of the record-sheet to be produced on the machine.

The paper-sheet $g$ is made in any desired length and wound up on an unwinding roller R, the shaft of which is supported in a slotted hanger-frame $R^1$ of the frame A, the sheet being then guided over a lower guide-roller $g^1$, then through the space or throat between the second guide-rail $E^6$ and die-plate $E^7$, and over an upper guide-roller $g^2$ to an upper winding-up roller $R^2$, the shaft of which is supported in bearings on the top of the frame A, as shown in Figs. 1 and 4. As will be observed, the throat is sufficiently wide, in this instance, to accommodate several thicknesses of paper, so that, if desired, several records may be produced by one playing. The lower and upper guide-rollers $g^1$ $g^2$, as well as the unwinding roller R, can be readily adjusted to a certain extent, so as to keep the traversing sheet taut in its motion through the space between the punches and die. An intermittent or step-by-step motion is imparted to the paper-sheet $g$ by a pawl and ratchet-mechanism, which is operated from the driving-shaft S by means of a connecting rod $g^3$ which is strapped at its rear-end to an eccentric $g^4$ on the end of the driving shaft S and adjustably connected at its front-end to the lower slotted end of a lever $g^5$ that is fulcrumed to an upright arm $g^6$ attached to the top of the frame A. To the upper slotted end of the lever $g^5$ is pivoted an adjustable pawl $g^7$ which engages the teeth of the ratchet-wheel $g^8$ on the shaft of the winding-up roller $R^2$, as shown clearly in Fig. 1. A check-pawl $g^9$ is arranged above the driving-pawl $g^7$, so as to prevent the ratchet-wheel and winding-up roller from turning in a direction opposite to the winding up motion of the sheet.

The paper-sheet is moved for the required distance by the pawl and ratchet-mechanism described at every rotation of the driving-shaft S, but alternately with the forward motion of the punches by the horizontally-reciprocating pushes, which are likewise operated by the driving-shaft S. The step-by-step travel of the music-sheet is controlled by the eccentric on the driving-shaft S, in such a manner that motion is imparted to the winding up roller $R^2$ only during the intervals in which the punches are in their normal positions.

It will be seen that uniform rotative movements are imparted to the reel $R^2$ between the operations of the punches E; and further that, as the punched paper winds upon the reel $R^2$, the speed of the paper is uniformly accelerated as the reel grows larger, the full size of the coil of punched paper being indicated by the dotted circle. Owing to the accelerated movements of the paper while its outer coils are winding upon the reel, the slots formed by the punches in the paper are lengthened, as compared with the slots for similar notes punched upon the inner coils of the paper. For instance, upon the inner coil the slot for an eighth note might be half an inch long, while upon the outer coil the slot for an eighth note might be three-quarters of an inch in length. When therefore the perforated sheet is placed in a music-player, and its leading end caught upon the usual winding-reel (which may be of the same diameter as the reel R², it will be played in exactly the same time or timing as adopted by the player while the sheet was being perforated, without the necessity of any attention to the timing upon the part of the person in charge of the music-player. Although corresponding slots in the final portion of the sheet are much longer than those in the leading portion thereof, still the sheet is drawn over the tracker-board in the music-player with correspondingly accelerated speed, whereby correct duration is given to the notes produced by the music-player. Below the front ends of the pushers F are guided in perforations of a forwardly-projecting ledge $d$ of the annular rail D as many lifters L as there are pushers, one lifter being located vertically below each pusher. The lifters L are arranged parallel with each other and are connected at their lower ends with the armatures $m$ of electro-magnets M, which are supported on cross-bars $M^1$ in horizontal rows below the top of the frame A, one row being slightly offset or staggered to the next adjacent row, as shown in Figs. 5 and 6, so as to provide the proper space for the parallel lifters.

The number of electro-magnets M corresponds to the number of pushers F and punches E. They are arranged preferably in eight rows, each containing seven electro-magnets. The armatures $m$ are suspended from headed pins $m^1$ that are supported in recesses of the inwardly-bent pole-ends of the electro-magnets, as shown in Fig. 4, so that the lifters can be freely moved between the pole ends of their controlling electro-magnets. The coils of the electro-magnets M are connected by conducting wires with binding-posts at the rear-end of the frame A, the binding-posts of each electro-magnet being connected by conducting wires $m^2$, united in a suitable cable, with contacts O, O¹, arranged below each key of the piano, as shown in Fig. 7, so that at each depression of a key by the player, the corresponding electro-magnet and thereby its armature, lifter, pusher and punch are operated.

In Fig. 6 is shown the arrangement of the conducting wires and binding posts at the right and left-hand sides of the supporting frame A, also the cable-connection with the piano or other instrument which is to be used for the producing of the perforated record-sheets. At Figs. 1 and 8 the other sides of the magnet circuits are shown united to a single conductor $m^3$, to which also lead the conductors $m^4$ from the upper set of contacts $o$ at the keys; said conductor including a source of power indicated diagrammatically at $m^5$.

The supporting crossbars $M^1$ of the electro-magnets M are attached to transverse angle-irons $M^2$ which are again attached to upright rails of the frame A, as shown in Figs. 1, 4 and 6. As soon as the key is depressed, a contact is made and the circuit of the corresponding electro-magnet closed, its armature attracted, its lifter raised and thereby the pusher resting thereon lifted into the position shown in dotted lines in Fig. 4. This brings the pusher in line with its punch E and produces thereby a perforation in the music-sheet that is located between the ends of the die-plate and the ends of the punches. When a number of keys are depressed, a corresponding number of electro-magnets are excited, their armatures attracted, the lifters on the same and their corresponding pushers lifted, and the punches in line with said pushers actuated, so as to produce a corresponding line of perforations in the paper-sheet. When a key is held depressed for a longer period of time, the number of perforations produced by the punches are repeated according to the duration of the depression of the key and the number of rotations of the driving-shaft and reciprocations of lifters, pushers and punches taking place during the depression, so that elongated perforations or slots are formed, as shown in Fig. 2, while when the keys are depressed only for a short time, a single perforation corresponding to each key is produced by the punches, while the extended depression of the keys produces a correspondingly-longer perforation by the quickly-repeated actions of the punches, as described. During the punching of the perforations the paper-sheet is at rest, it being moved forward for the next action of the punches in the intervals when the pushers are moved back by the cam-cylinder.

When the playing of the instrument is to be interrupted, a push-button or other switch (not shown) on the instrument is closed. This switch is placed in electric connection with the electro-magnet N, which is supported on the frame A below the winding-up roller, as shown in Fig. 1. The armature $n$ of this electro-magnet is connected by a lifter $n^1$ with the driving-pawl $q^7$ of the pawl and ratchet mechanism, so that the driving-pawl is raised out of engagement with the teeth of the ratchet-wheel and thereby instantly the motion of the traversing music-sheet interrupted until the player desires to resume the playing of the piece of music and the recording action of the punches by opening the switch and breaking the circuit of the electro-magnet N and causing thereby the dropping of the lifter $n^1$ and the reëngagement of the ratchet wheel $q^8$ by the driving-pawl $q^7$.

In place of the electro-magnets and armatures employed for raising the lifters and actuating the pushers and punches and for interrupting the sheet-feeding mechanism, other motor-devices may be used for operating the lifters, as I do not desire to confine myself to electrically-operated motor-devices shown.

The operation of my improved apparatus for producing perforated music-record sheets is as follows: When all the electric or other connections between the piano or other instrument on which the music is to be performed are made, and the paper-sheet and its pawl and ratchet-mechanism placed in proper position for action, power is applied to the driving-shaft of the cam-cylinder and the piece of music or the composition to be recorded, played by the artist or other performer. Every depression of the keys during the playing of the piece of music is recorded by a corresponding perforation in the traveling sheet, whose motion is kept up step-by-step in proper alternations with the rotations of the driving-shaft and the cam-cylinder on the same, so that by the joint action of the motor-devices, lifters operated by the same and pushers which are lifted into alinement with the spring-actuated punches the latter are actuated and the perforations in the paper-sheet corresponding to the depressions of the keys, produced, as shown in Fig. 2. The pushers are lifted only when the keys are depressed, their action being quickly repeated as long as they are held depressed, while the punches are returned by the springs acting on their heels, which, however, only act on the punches when the pushers are in their raised position, as shown in dotted lines in Fig. 4. As soon as the touch of the fingers on the keys is released, the corresponding lifters and pushers are instantly dropped, in connection with the dropping of the armatures of the motor-devices, as their circuits are interrupted by the separation of the contacts. When the playing is interrupted, the motion of the traveling-paper-sheet is arrested by closing the circuit of the lifter magnet, by which the drive-pawl is raised out of engagement with the ratchet wheel of the winding-up roller. By my improved apparatus, therefore, a piece of music played by the performer is correctly reproduced in the perforations of the traveling music-sheet. Moreover, the record sheet produced possesses the characteristics of the ordinary music-record sheet, as regards the relative proportions of the holes, the relative lengths of holes and slots, the lateral spacing of the holes and slots, etc., so that the same can be used either directly for playing the piece of music on a piano by means of any self-playing attachment of ordinary type, without the necessity of alteration thereof, or as original music-record sheet from which any number of copies may be made by the well-known pattern-controlled punch-selecting machines by which perforated music-sheets are multiplied, for sale.

Having thus described my invention, I claim as new and desire to secure by Letters Patent:

1. In a machine for producing perforated music-record sheets, the combination with a system of music keys and a series of parallel reciprocating pushers, of a transverse rail for supporting the same, a series of lifters below said pushers guided in perforations of said rail, motor-devices for said lifters, means controlled by said keys for actuating said motor-devices, a stationary bridge above the ends of the pushers, and guided and spring-actuated punches located at a higher level than the pushers, said punches having heels at their inner ends abutting against the lower end of the bridge, substantially as set forth.

2. In a machine for producing perforated music-record sheets, the combination with a system of music keys and parallel pushers, of means for imparting reciprocating motion to the pushers, a transverse rail for supporting said pushers, lifters guided in perforations of said supporting rail below the pushers, motor-devices controlled by said keys for actuating said lifters, and guided and spring-actuated punches operated by said pushers when the latter are placed by the lifters in line with the punches, substantially as set forth.

3. In a machine for producing perforated music-record sheets, the combination with a system of music keys and a rotary driving-shaft having a cam-cylinder, of a series of parallel pushers strapped to said cam-cylinder, a transverse rail for supporting the front-ends of the pushers, a bridge above the same, lifters guided in perforations of the supporting rail below the pushers, means controlled by said keys for raising said lifters at the proper time, punches provided with heels at their rear ends, springs applied to said bridge for engaging the heels of said punches, perforated guide-rails for said punches, a die-plate provided with perforations in line with the punches, means for feeding a paper-sheet between the punches and die-plate, and means connected with the driving-shaft for imparting a step-by-step motion to said paper-sheet during the backward motion of the pushers, substantially as set forth.

4. In a machine for producing perforated music-record sheets, the combination with a system of music keys, of a series of reciprocating pushers, intermittently-actuating lifters below said pushers and controlled by said keys, guided and spring-actuated punches arranged normally above said pushers but in line with the same when raised by the lifters, a perforated die-plate adjacent to the end of the punches, means for intermittently feeding a paper-sheet between the punches and die-plate during the return-motion of the pushers, and means for interrupting the motion of the feed-mechanism, substantially as set forth.

5. In a machine for producing perforated music-record sheets, the combination with a system of music keys, of a series of reciprocating pushers, a transverse guide-rail for supporting the front-ends of said pushers, said rail being provided with perforations below said front-ends, a series of lifters below said pushers, guided in the perforations of said rail, motor-devices for intermittently actuating said lifters, means located below said keys for enabling them to actuate said motor-devices when the keys are depressed, and connections between the said actuating means and the motor-devices, substantially as set forth.

6. In a machine for producing perforated music-record sheets, the combination with a system of music keys, of a series of reciprocating pushers, a series of guided and reciprocated lifters below the front-ends of the pushers, electro-magnets below said lifters, armatures connected with the lower ends of the lifters, contact-devices below said keys, and electric connections between the contact-devices and electro-magnets for actuating the armatures, lifters and pushers by the depressions of the keys.

7. In a machine for producing perforated music-record sheets, the combination with a system of music keys, of a series of reciprocating pushers, a series of intermittently-actuated lifters below the front ends of the same, said lifters being controlled by said keys, guided and spring-actuated punches located in line with the pushers when raised by the lifters, a die-plate provided with a series of perforations adjacent to and in line with the ends of the punches, means for guiding a paper-sheet between the ends of the pushers and the die-plate, a pawl and ratchet mechanism operated from the driving-shaft of the pushers for intermittently feeding said sheet over the die-plate, a lifter below the drive-pawl of the paper-feeding mechanism, and means extending to the keyboard for lifting said drive-pawl when the motion of the paper-sheet is to be interrupted, substantially as set forth.

8. The combination of a system of music keys, a system of punches mounted side by side in a row, a power-driven actuator, a system of pusher-bars mounted upon said actuator, a stationary plate upon which the free ends of said pusher-bars rest, and a system of key-controlled shifter-rods guided in said plate for moving said pusher-bars into engagement with said punches.

9. The combination of a system of music keys, a system of punches mounted in a row, an actuator, devices interposable between said punches and said actuator for enabling the latter to actuate the punches, a system of normally motionless rods controlling said interposable devices, and rod-driving devices controlled by said keys and mounted in tiers, the rods being of different lengths so as to extend from said interposable devices to the rod-driving devices in the several tiers.

10. The combination of a system of music keys, a system of punches mounted in a row, a system of punch-operators mounted in a row, a system of rods controlling said punch-operators, and rod-driving devices controlled by said keys and mounted in tiers, the driving-devices for adjoining rods being arranged in echelon, and the rods being of corresponding lengths.

11. The combination of a system of music keys, a system of rods, the system of rods being materially narrower than the system of keys, rod-driving devices controlled by said keys and mounted in rows, the driving-devices for adjoining rods being arranged in echelon, and a system of punches controlled by said rods.

12. In combination, a system of music keys, a system of punches, returning springs for said punches, a series of pushers out of line with said punches, a revolving crank or eccentric whereon said pushers are mounted, a system of shifters for moving said pushers into line with said punches, and a system of key-controlled electro-magnets having armatures connected to said shifters.

13. The combination of a system of music keys, a system of punches mounted side by side in a row, the distance separating adjoining punches being materially less than the thickness of the punches, a power-driven actuator, a system of pushers engaging said actuator, a single system of pusher-shifting rods, one for each pusher, said rods forming a single row, the width of the system of rods being about equal to the width of the system of punches, a system of electro-magnets having means for operating said shifting rods, and means for enabling the keys to control the magnets.

14. The combination of a system of music keys, a system of horizontal punches, an actuator, horizontally extending devices interposable between said punches and said actuator for enabling the latter to actuate the punches, a system of vertical rods controlling said interposable devices, and rod-driving electro-magnets controlled by said keys and mounted in tiers one above another, the rods being of different lengths so as to extend from said interposable devices to the rod-driving devices in the several tiers.

15. The combination of a system of music keys, a system of punches mounted in a row, a system of punch-operators mounted in a row, a system of rods controlling said punch-operators, and electro-magnets controlled by said keys and controlling said rods; the magnets being mounted in rows, and the magnets for adjoining rods being arranged in echelon, and the rods being of corresponding lengths.

16. In combination, a system of music keys, a system of punches, an actuator extending along said system of punches, devices interposable between said actuator and said punches, a system of upstanding rods for controlling said interposable devices, and a system of electro-magnets controlled by the keys and having armatures for operating said rods; said magnets being mounted in tiers one above another, with a series of magnets in each tier, and the rods being of various lengths to correspond with the positions of the magnets.

17. In combination, a system of music keys, a system of punches, an actuator extending along said system of punches, devices interposable between said actuator and said punches, a system of upstanding rods below said interposable devices for controlling the same, a system of electro-magnets controlled by said keys and mounted in tiers one above another, and armatures for lifting said rods; each magnet having at its upper end inwardly bent pole ends, beneath which its armature is supported.

18. In combination, a system of music keys, a system of punches, an actuator extending along said system of punches, devices interposable between said actuator and said punches, a system of upstanding rods below said interposable devices for controlling the same, a system of electro-magnets controlled by said keys and mounted in echelon in tiers one above another, and armatures to which the lower ends of said rods are connected; said rods being of assorted lengths, and each magnet having at its upper end inwardly bent pole ends, between which its rod may freely move, and beneath which its armature is supported.

19. In combination, a system of music keys, a system of punches, an actuator extending along said system of punches, devices interposable between said actuator and said punches, a system of upstanding rods below said interposable devices for controlling the same, a bar having guides for the upper ends of said rods, a system of electro-magnets controlled by said keys and mounted in echelon in tiers one above another, armatures to which the lower ends of said rods are attached; said rods being of assorted lengths, and each magnet having at its upper end inwardly bent pole ends, between which its rod may freely move, said pole ends overlying the armature, and mechanical means for sustaining and guiding said armature upon said pole ends.

20. In combination, a system of music keys, a system of punches, an actuator extending along said system of punches, devices interposable between said actuator and said punches, a system of upstanding rods for controlling said interposable devices, a system of electro-magnets controlled by said keys and each comprising a yoke or cross-bar, a series of transverse bars one above another to each of which several of said crossbars are attached, and armatures for actuating said rods, the latter being of assorted lengths to correspond with the positions of the magnets.

21. In combination, a system of music keys, a system of punches, a power-driven member capable of operating any of said punches, means for enabling the keys to control the operation of the punches by said power-driven member, a paper-feeding roll, a ratchet wheel therefor, a pawl operable by said power-driven member for turning said ratchet-wheel and roll, and means extending to the keyboard for disengaging said pawl from said ratchet-wheel at will.

22. The combination of a system of music keys, a system of punches, a power-driven member capable of operating any of said punches, electro-magnetic means for enabling the keys to control the operation of the punches by said power-driven member, a paper-feeding roll, a ratchet-wheel therefor, a pawl operable by said power-driven member for turning said ratchet-wheel and roll, and an electro-magnetic device for disengaging said pawl from said ratchet-wheel.

23. In combination, a system of music keys, a system of punches mounted in a row, a common actuator for said punches, key-controlled interponents between said actuator and said punches, a system of spring fingers for returning said punches, said spring fingers having hooks, a bar upon which said hooks are caught, a keeper for said hooks, a bar for tensioning said spring fingers, and paper-feeding means.

24. In combination, a system of music keys, means for feeding paper intermittently in substantially vertical direction, a power-driven actuator, a system of horizontal punches mounted in fixed supports and having upstanding bent-up lugs, pendent spring fingers engaging said lugs, a fixed rest against which said lugs normally abut, and key-controlled interponents between said actuator and said punches.

25. In combination, a system of music keys, intermittent paper-feeding means, a system of punches mounted in a row in fixed supports, a power-driven wrist, normally ineffective interponents pivoted upon said wrist and extending to said punches, a system of spring fingers extending in one direction from said punches, and a system of key-controlled rods extending in the opposite direction from said interponents.

26. In combination, a system of music keys, a system of punches, a power-driven wrist, interponents pivoted upon said wrist and extending to said punches but normally disengaged therefrom, key-controlled rods for moving said interponents into engagement with the punches, and means wholly independent of said interponents for guiding said rods.

27. In combination, a system of music keys, a system of punches, a power-driven wrist, interponents pivoted upon said wrist, a rest-plate for the free ends of said interponents, and key-controlled rods guided in said plate for moving said interponents into engagement with the punches.

28. In combination, a system of music keys, an actuator, a system of normally stationary punches supported wholly independently of said actuator, a system of interponents constantly driven by said actuator, and a system of key-controlled interponent-controllers supported wholly independently of said interponents, but directly engageable therewith.

29. In combination, a system of music keys, a system of punches, an actuator, a system of interponents between said punches and said actuator, a system of rods for moving said interponents, a system of electro-magnets in circuit with the keys, and armatures for said magnets; said interponents being pivoted upon said actuator, and said rods extending directly from said armatures to said interponents.

30. In combination, a system of music keys, a system of punches, an actuator, constantly-acting interponents extending from said actuator to said punches, a system of normally stationary rods for controlling said interponents, a system of electro-magnets in circuit with the keys and having armatures engaged by said rods, means for returning said punches to normal position after actuation, and supports against which said punches normally rest with their active ends out of contact with the paper.

31. In combination, a system of music keys, a system of normally motionless punches, a power-driven actuator, a system of interponents between said punches and said actuator, means wholly independent of said actuator for supporting and guiding said punches, a system of electro-magnets in circuit with said keys and having armatures, normally motionless mechanical devices for enabling said armatures to operate said interponents, individual springs for returning said punches, rests against which said punches are normally pressed by said springs, and means for feeding paper intermittently past the system of punches.

32. In combination, a system of music keys, a system of punches, a power-driven actuator, a system of interponents between said punches and said actuator and constantly operated by the latter, a system of electro-magnets in circuit with said keys and having armatures, and mechanical devices extending from said armatures to said interponents for setting the latter, said setting devices being normally stationary and being guided independently of said interponents, and the latter being movable relatively to said setting devices.

33. In combination, a system of music keys, a system of punches mounted in a row, a revoluble eccentric or crank wrist, interponents pivoted upon said wrist and extending to said punches, a system of electromagnets in circuit with said keys and having armatures, and normally stationary mechanical devices extending from said armatures to said interponents.

34. In combination, a system of music keys, a system of punches, a power-driven actuator, a system of interponents pivoted upon said actuator, a system of electro-magnets in circuit with said keys and having armatures, and rods extending directly from said armatures to said interponents.

35. In combination, a system of music keys, means for feeding paper in substantially vertical direction, a system of horizontal punches mounted in a row, a power-driven wrist, horizontal interponents pivoted upon said wrist and extending to said punches but normally disengaged therefrom, a system of rods upstanding beneath said interponents for moving the same into engagement with the punches, and a system of electro-magnets in circuit with said keys and mounted at the lower ends of said rods and having armatures for operating said rods.

36. In combination, a system of music keys, a system of punches, a power-driven wrist, interponents pivoted upon said wrist and extending to said punches but normally disengaged therefrom, rods for moving said interponents into engagement with the punches, means wholly independent of said interponents for guiding said rods, and a system of electro-magnets in circuit with said keys and having armatures engaged by said rods.

37. In combination, a system of music keys, a system of punches, a power-driven wrist, interponents pivoted upon said wrist, a rest-plate for the free ends of said interponents, rods guided in said plate for setting said interponents, and a system of electro-magnets in circuit with said keys and having armatures engaging the other ends of said rods.

38. In combination, a system of music keys, an actuator, a system of normally stationary punches supported wholly independently of said actuator, a system of interponents constantly driven by said actuator, a system of interponent-controllers supported wholly independently of said interponents and normally motionless, said interponents being movable to and fro past the active ends of said controllers, and a system of electro-magnets in circuit with said keys and having armatures for operating said controllers.

39. In combination, a system of music keys, a system of normally stationary punches, a system of constantly acting but normally ineffective punch-drivers, a system of normally stationary rods controlling said punch-drivers, armatures upon the ends of said rods, and a system of electro-magnets in circuit with said keys and operating said armatures.

40. In combination, a system of music keys, power-driven intermittent paper-feeding means, a power-revolved eccentric or crank wrist, a system of normally stationary punches, interponents pivoted upon said wrist, a system of electro-magnets in circuit with the keys and having armatures, normally motionless means operated by the armatures for setting said interponents, and individual returning springs for said punches.

41. In combination, a system of music keys, a system of normally stationary punches mounted in a single row, a system of constantly acting but normally ineffective punch-operators mounted in a single row, a system of rods mounted in a single row for rendering all of said punch-operators effective, and a system of electro-magnets in circuit with said keys and having armatures for operating said rods.

42. In combination, a system of music keys, a system of normally stationary punches mounted in a single row, a system of constantly acting but normally ineffective punch-operators mounted in a single row, a system of rods mounted in a single row for rendering all of said punch-operators effective, and a system of electro-magnets in circuit with said keys and mounted in a single range and having armatures for operating said rods.

43. In combination, a system of music keys, a system of horizontal punches, a power-driven rotary eccentric or crank wrist, interponents pivoted upon said wrist and extending horizontally to said punches, means independent of said wrist for supporting the punch ends of said interponents, individual springs for returning said punches, a system of upstanding rods in a single row beneath said interponents, horseshoe magnets in tiers one above another and having armatures to which the lower ends of said rods are attached, said magnets being arranged in echelon, means for guiding paper vertically past said punches, a reel whereon the punched paper is wound, and pawl-and-ratchet mechanism connected to said crank wrist and to said reel, for imparting to the latter between punch operations uniform rotative movements.

44. In combination, a system of music keys, a system of punches, power-driven key-controlled means for operating the punches, a reel upon which the paper winds after it is punched, and power-driven means for imparting uniform rotative movements to said reel only between punching operations, whereby as the reel fills, the paper winding thereon is drawn more rapidly past the punches.

45. In combination, a system of music keys, a system of punches controlled by the keys, and means for feeding paper past the punches at uniformly accelerated speed only between punching operations.

46. In combination, a system of music keys, a system of punches controlled by the keys, a rotary driver common to said punches for operating the same, a reel upon which the paper winds after it is punched, and pawl-and-ratchet mechanism operated by said rotary driver and connected to said reel for imparting uniform movements to the latter only between punching operations, whereby as the reel fills, the paper winding thereon is drawn more rapidly past the punches, and the perforations are timed accordingly.

47. In combination, a system of music keys, a system of nearly contiguous punches, a system of returning springs for said punches, a system of pushers normally out of line with said punches, a common power-driven actuator for said pushers, and a system of shifters mounted independently of the keys and of the pushers, and connections under the control of said keys for moving the pushers into engagement with the punches.

48. In combination, a system of music keys, having a keyboard, a system of punches, returning springs for said punches, a series of pushers out of line with said punches, a crank or eccentric whereon said pushers are similarly mounted so as to be operated similarly and simultaneously thereby, shifters mounted independently of the keys and of the pushers for moving said pushers into line with said punches, and connections from the keys to the shifters.

49. The combination of a system of music keys, a system of punches nearly contiguous in a row, and a system of punch-controlling electro-magnets controlled by the keys and mounted in numerous rows in a single wall, the magnets for adjoining punches being arranged in echelon throughout the set of rows.

50. In combination, a system of music keys forming a keyboard, a system of punches nearly contiguous in a row, one punch for each of said keys, a power-driven actuator, means wholly independent of said actuator for supporting and guiding said punches, a system of interponents extending from said actuator to said punches, said actuator being provided with means for effecting similar and simultaneous operations of all of said interponents, individual springs for returning said punches, rests against which said punches are normally pressed by said springs, a system of interponent lifters mounted independently of the keys and of the interponents, connections from said keys to said controllers, and means for feeding paper intermittently across the row of punches; the keys and controllers being returnable to normal positions independently of the interponents.

51. In combination, a system of music keys forming a keyboard, means for feeding paper in a substantially vertical direction, a system of horizontal punches nearly contiguous in a substantially horizontal row, a power-driven actuator, and interponents between said actuator and said punches and liftable by the keys; said actuator being provided with means for effecting similar and simultaneous operations of all of said interponents, said interponents being movable in one direction by gravity, and means mounted independently of the keys and of the interponents for moving the latter only in the opposite direction.

52. In combination, a system of music keys forming a keyboard, means for feeding paper intermittently in a substantially vertical direction, a power-driven actuator, a system of horizontal punches mounted in fixed supports independently of said actuator, said punches being nearly contiguous in a substantially horizontal row, key-operated interponents similarly pivoted to said actuator so as to be similarly and simultaneously operated thereby, a fixed support upon which said interponents rest, springs for returning said punches, and fixed supports against which said punches normally rest.

53. In combination, a system of music keys forming a keyboard, a system of punches mounted in a row and nearly contiguous, a power-driven actuator for said punches, key-controlled interponents between said actuator and said punches, lugs or toes bent up from said punches, spring fingers bearing against said lugs, a fixed rest bar against which said toes are pressed by said springs, and intermittent paper-feeding means, said actuator being provided with means for effecting similar and simultaneous operations of said interponents.

54. In combination, a system of music keys, a system of punches nearly contiguous in a row, a revoluble eccentric or crank wrist, a system of similar interponents pivoted upon said wrist and extending therefrom to said punches, a system of rods all on one side of the system of interponents, and supported independently of the latter, for moving the interponents into engagement with said punches, and means for feeding paper intermittently across said row.

55. In combination, a system of music keys, a system of punches nearly contiguous in a row, a power-driven actuator, a system of similar interponents similarly pivoted upon said actuator, means controlled by the keys and mounted independently of the keys and the interponents, for operating the latter, fixed supporting and power-driven means for effecting intermittent movement of a web of paper across said row of punches.

56. In combination, a system of music keys having a keyboard, a system of nearly contiguous punches normally stationary, a power-driven actuator, a system of interponents pivoted to said actuator so as to be moved similarly and simultaneously thereby, a system of interponent controllers mounted independently of the keys and of the interponents, connections extending from said keys to said controllers, and means independent of said actuator and of said controllers for supporting the free ends of said interponents.

57. In combination, a system of music keys, means for feeding paper in substantially vertical direction, a system of horizontal punches nearly contiguous in a row, a power-driven wrist, horizontal interponents pivoted upon said wrist and extending to said punches but normally disengaged therefrom, a system of rods all upstanding beneath said interponents for moving the same into engagement with the punches, keys for operating the rods, means independent of the interponents and of the keys for guiding the rods, and means independent of the rods for supporting the free ends of the interponents.

58. In combination, a system of music keys having a keyboard, a system of normally stationary nearly contiguous punches, a system of constantly and similarly acting but normally ineffective punch-drivers, and a system of normally stationary rods controlling said punch-drivers, and connections from the keys to the rods; the latter mounted independently of the keys and of the punch-drivers.

59. In combination, a system of music keys, paper-feeding means, a power-revolved eccentric or crank wrist, a system of nearly contiguous and normally stationary punches, interponents pivoted upon said wrist, and means controlled by the keys and guided independently of the interponents for causing the interponents to operate the punches, the latter being provided with individual returning springs, and a fixed support for the free ends of the interponents.

60. In combination, a system of music keys having a keyboard, a system of nearly contiguous punches, a power-driven actuator, a system of interponents pivoted upon said actuator, so as to be reciprocated similarly and simultaneously thereby, a system of controllers mounted independently of the keys, connections from the keys to the controllers, a fixed rest for said interponents at their free ends, and means independent of said interponents for guiding said controllers.

61. In combination, a system of music keys, a system of nearly contiguous and normally stationary punches mounted in a single row, a system of constantly acting but normally ineffective punch-operators mounted in a single row, a system of rods, all on one side of the system of punch-operators and mounted in a single row, for rendering all of said punch operators effective, and keys electrically connected to said rods; the latter being disconnected from the punch-operators, so as not to be moved thereby, and capable of moving the punch-operators in only one direction.

62. In combination, a system of music keys, means for feeding paper in substantially vertical direction, a system of horizontal punches nearly contiguous in a single row, a system of constantly and similarly acting but normally ineffective punch-operators mounted horizontally in a single horizontal row, and a system of rods upstanding beneath said punch-operators for lifting the same, one rod for each of said keys, and keys connected to the rods, said rods disconnected from the punch-operators so as not to be moved thereby, and mounted independently of the keys.

63. In combination, a system of music keys having a keyboard, a system of nearly contiguous punches each having a heel, a system of springs bearing against said heels, a stop against which said punches are pressed by said springs, a power-driven actuator extending along said system of punches, shiftable devices connected to said actuator for operating said punches in opposition to the tension of said springs, controllers mounted independently of said keys and of said shiftable devices for rendering said shiftable devices effective, and connections from said keys to said controllers; said shiftable devices being simultaneously and similarly reciprocated by said actuator.

64. The combination of a system of music keys, a system of rods, the system of rods being materially narrower than the system of keys, rod-driving electro-magnets controlled by said keys and mounted in numerous rows, the magnets for adjoining rods being mounted in echelon throughout the set of rods, a system of nearly continguous punches controlled by said rods, and a system of punch-controllers shiftable by said rods; all of the latter mounted on one side of the punch-controllers and in a single row.

65. In combination, a system of music keys, a system of key-controlled punches, punch-operating devices, paper-feeding devices, a power-driven member operatively connected to and constantly operating both said punch-operating devices and said paper-feeding devices, and means extending to the keyboard for rendering the paper-feeding devices inoperable by said power-driven member at will.

66. In combination, a system of music keys, a system of punches, a power-driven member, means for enabling any key by a single depression thereof to cause its punch to be given a succession of strokes by said power-driven member, paper-feeding mechanism operatively connected to said power-driven member and constantly operated thereby and effective to feed a web of paper intermittently, and means extending to the keyboard for preventing the paper from being fed during the operation of said power-driven member, at will.

67. In combination, a system of music keys, a system of punches mounted in a row, one punch for each of said keys, a power-driven member capable of imparting movements to any of said punches at uniform intervals, means for enabling the keys to control the operation of the punches, paper-feeding means constantly operated by said power-driven member and effective in the intervals between the punch-driving movements thereof, and means extending to the keyboard and operable at will for preventing feed of the paper by said power-driven member.

68. In combination, a system of music keys, a system of punches, a power-driven member capable of operating any of said punches, means for enabling any key to cause its punch to be given a succession of strokes during a single depression of the keys, a paper-feeding roll, pawl-and-ratchet mechanism constantly operated by said power-driven member for turning said roll, and means extending to the keyboard for preventing said roll from being turned by said power-driven member, at will.

69. In combination, a system of music keys, a system of punches, a power-driven member capable of operating any of said punches, electro-magnetic devices for enabling the keys to control the operation of the punches by said power-driven member, paper-feeding devices constantly operated by said power-driven member, and an electro-magnetic device for preventing the feed of the paper by said power-driven member, at will.

70. In a machine for producing perforated music-record sheets, the combination with a system of music keys, of a series of parallel reciprocating pushers, a series of lifters below said pushers and supported independently thereof and controlled by said keys, the pushers being supported independently of said lifters, a series of guided and spring-actuated punches nearly contiguous in the same vertical planes with the pushers, but at a higher elevation, and a perforated die-plate adjacent to the ends of the punches.

71. In a machine for producing perforated music-record sheets, the combination of a system of music keys, a series of parallel pushers, a rotary eccentric for imparting reciprocating motion to the pushers, a series of lifters below said pushers, and supported independently thereof, motor-devices controlled by the keys for raising the lifters and pushers at the proper time, the pushers being supported independently of said lifters, spring-actuated punches arranged at a higher level than the pushers, and a perforated die-plate for said punches.

72. In a machine for producing perforated music-record sheets, the combination with a system of music keys and parallel pushers, of means for imparting reciprocating motion to the same, lifters below the front ends of said pushers, one for each pusher, motor-devices controlled by the keys and unattached to the lifters, for raising said lifters at the proper time, spring-actuated punches nearly contiguous and located at a higher level than the pushers, and a die-plate provided with perforations in line with the ends of the punches.

73. In a machine for producing perforated music-record sheets, the combination with a system of music keys, a series of reciprocating pushers, a series of intermittently-actuated lifters, below the front-ends of the same, said lifters being unattached to said pushers and controlled by said keys, guided and spring-actuated punches nearly contiguous and in line with the pushers when raised by the lifters, and a die-plate provided with a series of perforations in line with the ends of the punches.

74. In combination, a system of music keys forming a keyboard, a system of punches nearly contiguous in a row, means for feeding paper intermittently across said row of punches, a power-driven actuator, interponents extending from said actuator to said punches, said actuator being provided with means for effecting similar and simultaneous operations of all of said interponents, means for returning said punches to normal position after actuation, and supports against which said punches normally rest with their active ends out of contact with the paper; constantly operable means being provided between the keys and the interponents for setting the latter to effective positions, said setting means being normally motionless during the operation of said actuator, and the keys being returnable to normal positions independently of the interponents.

In testimony that I claim the foregoing as my invention, I have signed my name in presence of two subscribing witnesses.

GEORGE MACHLET, Jr.

Witnesses:
BENJ. GOEPEL,
HENRY J. SUHRBIER.